May 31, 1932.  W. A. BRACKEN  1,860,921
COMBINED SUPPORTING AND RATCHET BRACKET
Filed Feb. 10, 1928
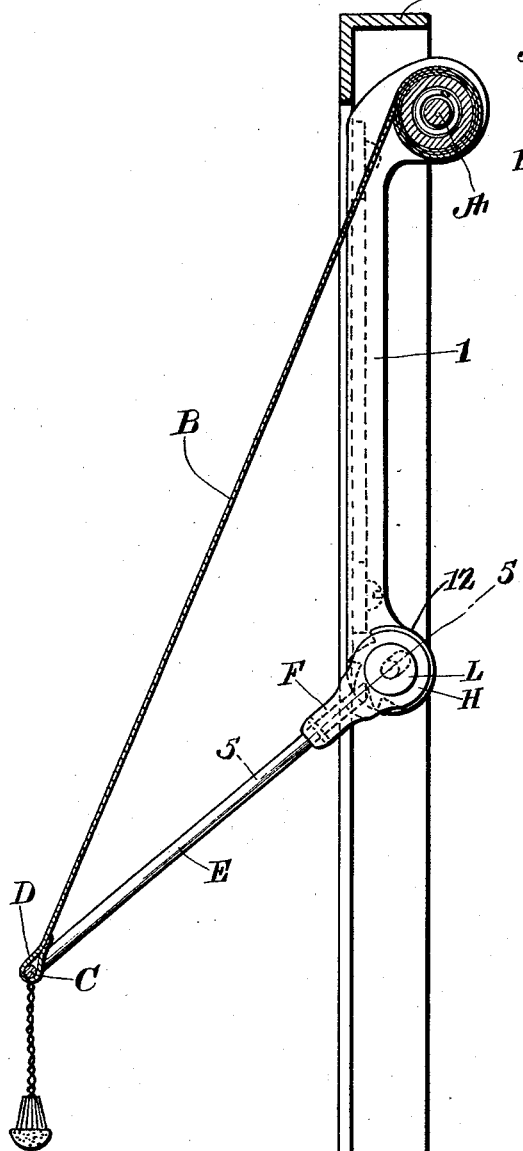
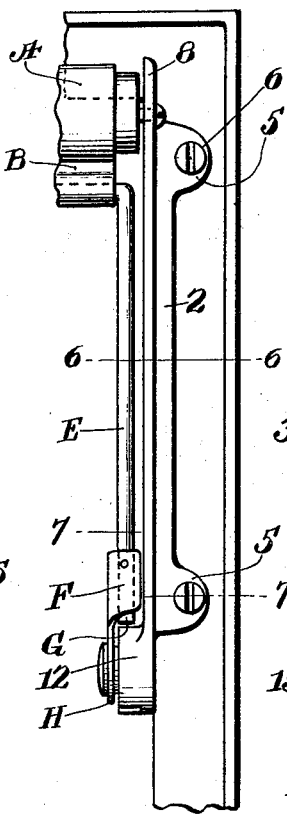
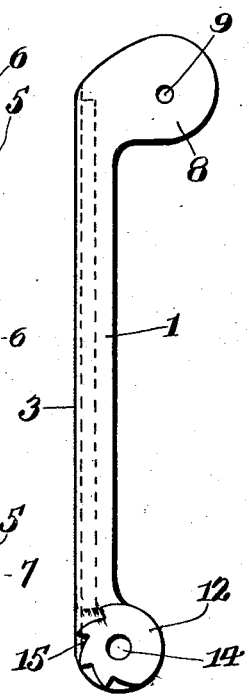
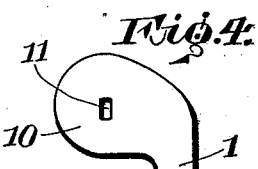
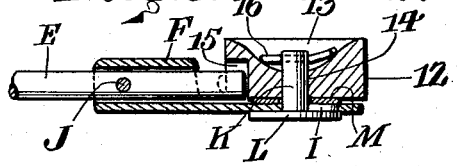
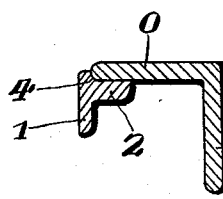
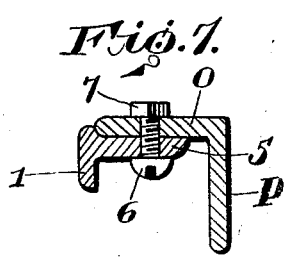
INVENTOR.
William A. Bracken,
BY
Geo. P. Kimmel
ATTORNEY.

Patented May 31, 1932

1,860,921

UNITED STATES PATENT OFFICE

WILLIAM A. BRACKEN, OF ELDORADO, KANSAS, ASSIGNOR OF ONE-HALF TO WILLIAM B. JONES, OF AUGUSTA, KANSAS

COMBINED SUPPORTING AND RATCHET BRACKET

Application filed February 10, 1928. Serial No. 253,501.

This invention relates to a combined supporting and ratchet bracket, designed primarily for use in connection with spring controlled rolling awning structures, but it is to be understood that a bracket, in accordance with this invention may be employed in any connection for which it is found applicable, and the invention has for its object to provide, in a manner as hereinafter set forth, a bracket for supporting an awning of the spring controlled rolling type and for latching the awning body in selected angular positions with respect to doors, windows and other openings.

A further object of the invention is to provide, in a manner as hereinafter set forth a combined supporting and ratchet bracket constructed and arranged to provide for pivotally supporting the yoke of the awning and for rotatably supporting a spring controlled winding roller for the awning body.

Further objects of the invention are to provide, in a manner as hereinafter set forth, a combined supporting and ratchet bracket for use in connection with spring controlled rolling awning structures and which is simple in its construction and arrangement, strong, durable, compact, thoroughly efficient in its use, readily secured in position, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications may be resorted to which fall within the scope of the claim hereunto appended.

In the drawings wherein like reference characters denote corresponding parts throughout the several views:

Figure 1 is a fragmentary view in section of a door or window frame illustrating a combined supporting and ratchet bracket connected therewith and further illustrating a spring controlled rolling awning structure supported by and latched from the bracket.

Figure 2 is a fragmentary view in front elevation of a window frame having connected therewith a combined supporting and ratchet bracket in accordance with this invention and further illustrating a fragmentary view of the spring controlled rolling awning structure.

Figure 3 is an elevation of a combined supporting and ratchet bracket looking towards one side thereof.

Figure 4 is a fragmentary view of a modified form of bracket.

Figure 5 is a section on line 5—5 Figure 1.
Figure 6 is a section on line 6—6 Figure 2.
Figure 7 is a section on line 7—7 Figure 2.

For the purpose of describing the bracket, in accordance with this invention, it will be noted that the brackets are used in pairs, secured to opposite side rails of the door or window frame in alignment, one with the other, and wherein each bracket of the pair is the complement of the other, with the exception of the shape of the openings which support the pintles of a spring controlled winding roller.

One of the brackets of the pair is illustrated, by way of example, in connection with a spring controlled rolling awning structure and the latter includes a spring controlled winding roller A, an awning body or web B which automatically winds on the roller A and is withdrawn or unwound from the latter when desired, a yoke C which has the outer end of the awning body or web B connected therewith as at D. Only one of the arms of the yoke C is illustrated and which is indicated at E. Both arms of the yoke C are of like construction. Secured to each of the arms E at the free end thereof and positioned inwardly with respect to the free terminus of the arm is a sleeve F arranged whereby the end G of the arm E will project beyond the rear end of the sleeve F. Integral with one side of the rear end of the sleeve F and offset outwardly with respect to the plane of the arm E is a disc H provided with a slot I. The sleeve F is fixedly secured to the arm E by a diametrically disposed rivet or pin J. Extending through the slot I is a pivot K having its outer end provided with a head L. Interposed between the inner face of the disc or plate H and mounted on the pivot K is a washer M. The yoke C and awning body or web B are pulled outwardly or off the roller A against the action of the controlling spring of the latter whereby when the awning body B or yoke C is released the roller A will automatically wind the awning body B and the latter in turn will carry the yoke C therewith to the position shown in Figure 2. The side rails of the window frame N, only one of which is shown, is of angle shaped cross section to provide an outer leg O and a rearwardly extending leg P. The leg O is disposed at right angles with respect to the outer end of the leg P. The combined supporting and ratchet bracket is positioned against the rear face of the leg O of the side rail of a window, abuts against the free edge of such rail and is further secured by suitable holdfast devices against the rear face of said leg and in this connection see Figures 2, 6 and 7.

The combined supporting and ratchet bracket in accordance with this invention and for the purpose set forth is formed from a unitary member and comprises a body portion 1 of substantial length and width and formed integral with the inner side face thereof and extending at right angles with respect thereto is a flange 2 positioned adjacent the forward side edge 3 of the body portion 1 to form a shoulder 4 which abuts against the free edge of the leg O of the side rail of a window. See Figure 6. Each end of the flange 2 has extending laterally therefrom an apertured ear 5 through which extend holdfast devices 6 for fixedly securing the bracket in position with respect to the side rail of a window frame. When the bracket is secured in position the flange 2 and ears 5 abut against the inner face of the leg O of the rail of a window frame. See Figure 7. The holdfast devices 6 extend through the ears 5 and also through the leg O and carry on their outer ends securing nuts 7. As shown each holdfast device consists of a headed screw which projects from an ear 5 and the leg O. See Figure 7.

Formed integral with the upper end of the body portion 1 and extending rearwardly therefrom and with reference to Figure 3 is a support 8 provided with a circular opening 9 for the reception of the rotatable pintle of the shade roller. The support 8 extends a sufficient distance rearwardly with respect to the body portion 1 for the purpose of supporting the winding roller A in the position as shown in Figure 1.

The difference between the construction shown in Figure 3 with respect to that shown in Figure 4 resides solely in providing the support 10, Figure 4, which corresponds to the support 8 in Figure 3, with a squared opening or slot 11 for the reception of the stationary pintle of the winding roller A. Otherwise than that as stated the form shown in Figure 4 will be exactly as that shown in Figure 3. The body portion in Figure 4 is indicated at 1.

Formed integral with the lower end of the body portion 1 is a circular extension 12 of a thickness greater than the thickness of the body portion 1. The extension 12 has its rear face flush with the inner side face of the body portion and is formed with a concavity or recess 13 opening at the rear face of the extension. The extension 12 is furthermore formed with an axially arranged opening 14 which extends from its outer face and communicates with the recess or concavity 13. The extension 12 has its edge at the front thereof cut away to provide a set of forwardly directed ratchet teeth 15 which selectively coact with the end of an arm E for the purpose of latching the awning body B in angular position with respect to the window frame. See Figure 1. The teeth are of a width less than the thickness of the extension 12 and the teeth extend from the outer face of the extension 12 to a point removed from the rear face thereof. The teeth 15 are disposed upon an arc. The pivot K extends through the opening 14 and into the concavity or recess 13 and is connected with the bracket by a cotter pin 16 extended through the pivot K and seated in the concavity or recess 13. The opening 14 is arranged forwardly with respect to the opening 9 or slot 11. The washer M is interposed between the extension 12 and the plate or disc 8. The slot I provides for the shifting of the arm E for the purpose of releasing the end G thereof from latching position with respect to a ratchet tooth.

It is believed the many advantages of a combined supporting and ratchet bracket in accordance with this invention, can be readily understood, and although the preferred embodiment of the invention is a illustrated and described, yet it is to be understood that changes in the details of construction can be had which fall within the scope of the invention as claimed.

What I claim is:

A combined supporting and ratchet bracket for a spring controlled awning body adjusting yoke comprising a flat, narrow, elongated body portion, a flange integral with the inner side face and adjacent the forward edge of said body portion, disposed at right angles with respect thereto and providing in connection with said body portion a shoulder, said flange being formed with laterally disposed spaced apertured ears for the passage of holdfast devices to anchor said body portion in position to have said shoulder abut the edge of a window opening, a rearwardly directed support integral with one end of said body portion and formed with an opening for the reception of a shade roller pintle, a rearwardly directed extension of circular form integral with the other end of said body portion and formed with an axial opening and a cavity opening at its rear face adapted to receive respectively the pivot for an arm of the adjusting yoke, and a cotter pin, said extension of greater thickness than the thickness of said body portion and having its outer face spaced from the outer face of the latter, and said extension cut away inwardly of its front and bottom edges to provide an arcuate row of ratchet teeth adapted to latch the arm of the adjusting yoke in selected positions, said teeth of a width less than the thickness of the extension.

In testimony whereof, I affix my signature hereto.

WILLIAM A. BRACKEN.